Dec. 31, 1935.  A. O. SAMUELS  2,026,286

BAKING AND SEARING PLATE

Filed Dec. 8, 1933

INVENTOR
ABE O. SAMUELS
BY
ATTORNEY

Patented Dec. 31, 1935

2,026,286

UNITED STATES PATENT OFFICE 2,026,286

BAKING AND SEARING PLATE

Abe O. Samuels, Rochester, N. Y., assignor to Samson-United Corporation, Rochester, N. Y.

Application December 8, 1933, Serial No. 701,493

3 Claims. (Cl. 53—10)

This invention relates to baking and searing plates such as waffle iron grids, griddle cake plates etc., which are cast of an aluminum alloy and has for its object to provide the baking or searing surface of such plates with a surface finish which will prevent electrolysis in the alloy when a liquid is brought in contact with the surface thereof without coating the surface with a metal coating that will interfere with the heat conductivity of the plate.

A further object of this invention is to provide a novel surface finish on the baking and searing plate which will keep the batter from sticking thereto during the baking and searing process.

These and other objects and attendant advantages of this invention will become more readily apparent from a detailed description thereof which follows, reference being had to the accompanying drawing in which Figure 1 is a top plan view of a waffle iron grid.

In the figures of the drawing like reference numerals indicate like parts.

Figure 1:
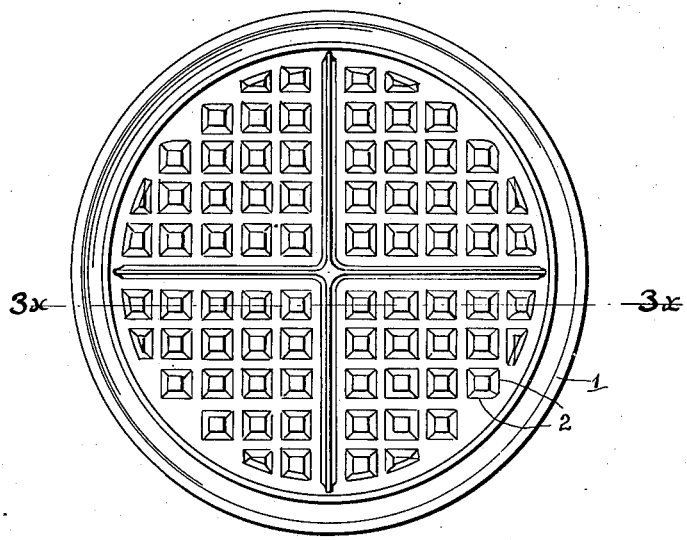
Figure 2:
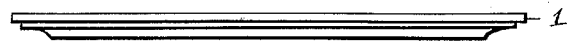
Figure 2 is an end elevation thereof.
Figure 3:
Figure 3 is a cross section of the grid, the section being taken on the line 3x—3x of Figure 1.

The invention forming the subject matter of my present invention consists in providing the baking surface of a cast aluminum alloy baking or searing plate with a surface finish which not only improves the appearance of this surface but closes the minute pores in the surface of such a plate and as the result of it prevents electrolysis in the alloy on the surface of the plate when liquid is brought in contact with it and keeps the batter to be baked or seared thereon from sticking thereto during the baking and searing process.

Grids of waffle irons and griddle cake baking plates which are made of an aluminum alloy by the so-called die casting process have a comparatively smooth finish so that heretofore it has been the universal practice to use no other finishing process on the baking surface provided by these plate members. Despite the smooth finish of the die castings however, the batter seared and baked on these plates has a tendency to stick to the surface during the baking and searing process. This is due to the fact that while the baking surface of these plates appears to be smooth, there are, as a matter of fact, minute holes in the surface that are invisible to the eye. These minute holes or pores cause the batter to stick to the baking surface during the baking or searing process. Furthermore it has been found that electrolysis takes place on the surface of the aluminum alloy as soon as liquid is brought in contact with it.

This has been eliminated by my present invention without adding a metal coating to the surface that would interfere with the heat conductivity of the baking and searing plate. This consists in flattening the baking or searing surface of the plate by a hammering or impacting process which compresses the surface metal only of said plate to produce a non-porous, water-repellant working surface having a polished appearance. The pores in the irregular surface of the casting are thus closed by this hammering or impacting action against the surface of the casting which results in an extremely smooth working surface even in the corners 2, 2 of the cores of the waffle iron grid 1 shown in the drawing. Liquid brought in contact with plate thus prepared is thus kept from permeating the surface of it and cannot set up electrolysis in the alloy of the casting. This will also keep the batter poured over it for baking or searing from entering the pores in the casting and from adhering to the surface thereof as the result of it during the baking or searing process. In addition the plate will retain its original heat conductivity from the bottom to the top thereof which would not be the case if a metal coating were applied to the plate in place of the hammer finish. Various well known methods may be used for hammering or impacting the metal surface of the plates. One of these methods is produced in a ball mill in which the metallic surfaces of the plates are subjected to the repeated impact of hardened balls.

I claim:

1. As an article of manufacture, a cast metal plate for a baking appliance having a working surface formed integrally on said plate by compressing the surface metal thereof to produce a homogeneous substantially non-porous, water-repellent surface for baking purposes.

2. As an article of manufacture, a cast metal plate for a baking appliance, a working surface formed integrally on said plate by hammering the surface metal thereof to compress the same and produce a homogeneous substantially non-porous, water-repellent surface for baking purposes.

3. As an article of manufacture, an aluminum alloy plate of irregular cross section for a baking appliance, having a working surface formed integrally on said plate by impacting the surface metal thereof to produce a homogeneous substantially non-porous, water-repellent surface for baking purposes.

ABE O. SAMUELS.